United States Patent [19]

Wyland

[11] 4,245,616
[45] Jan. 20, 1981

[54] SOLAR TRACKING DEVICE

[76] Inventor: Richard R. Wyland, 3330 Bellaire, Wichita, Kans. 67218

[21] Appl. No.: 888,473

[22] Filed: Mar. 20, 1978

[51] Int. Cl.³ .............................................. F24J 3/02
[52] U.S. Cl. .................................... 126/425; 126/438
[58] Field of Search ............... 126/270, 271, 424, 425, 126/438, 439; 237/1 A; 60/641; 353/3; 350/288, 292

[56] References Cited

U.S. PATENT DOCUMENTS

| 820,127 | 5/1906 | Pope | 126/438 |
|---|---|---|---|
| 1,047,554 | 12/1912 | Nichols | 126/438 |
| 1,951,404 | 3/1934 | Goddard | 126/270 |
| 1,989,999 | 2/1935 | Niederle | 126/271 |
| 3,977,773 | 8/1976 | Hubbard | 350/292 |
| 4,056,309 | 11/1977 | Harbison et al. | 126/270 |
| 4,077,392 | 3/1978 | Garner | 126/438 |
| 4,109,638 | 8/1978 | Matlock et al. | 126/271 |
| 4,111,184 | 9/1978 | Perkins | 126/271 |
| 4,122,827 | 10/1978 | Rhodes | 126/270 |

FOREIGN PATENT DOCUMENTS 308399  8/1971  U.S.S.R. ................................. 353/3

Primary Examiner—James C. Yeung
Assistant Examiner—Larry Jones
Attorney, Agent, or Firm—John H. Widdowson

[57] ABSTRACT

A solar tracking device having a plurality of reflector banks for reflecting the sun rays onto collector tubes and heating a fluid circulated therethrough. The reflector banks synchronized to follow the sun during the daily and yearly cycle of the earth as the earth orbits around the sun. The device by accurately following the sun provides a more efficient means of collecting solar energy.

5 Claims, 7 Drawing Figures

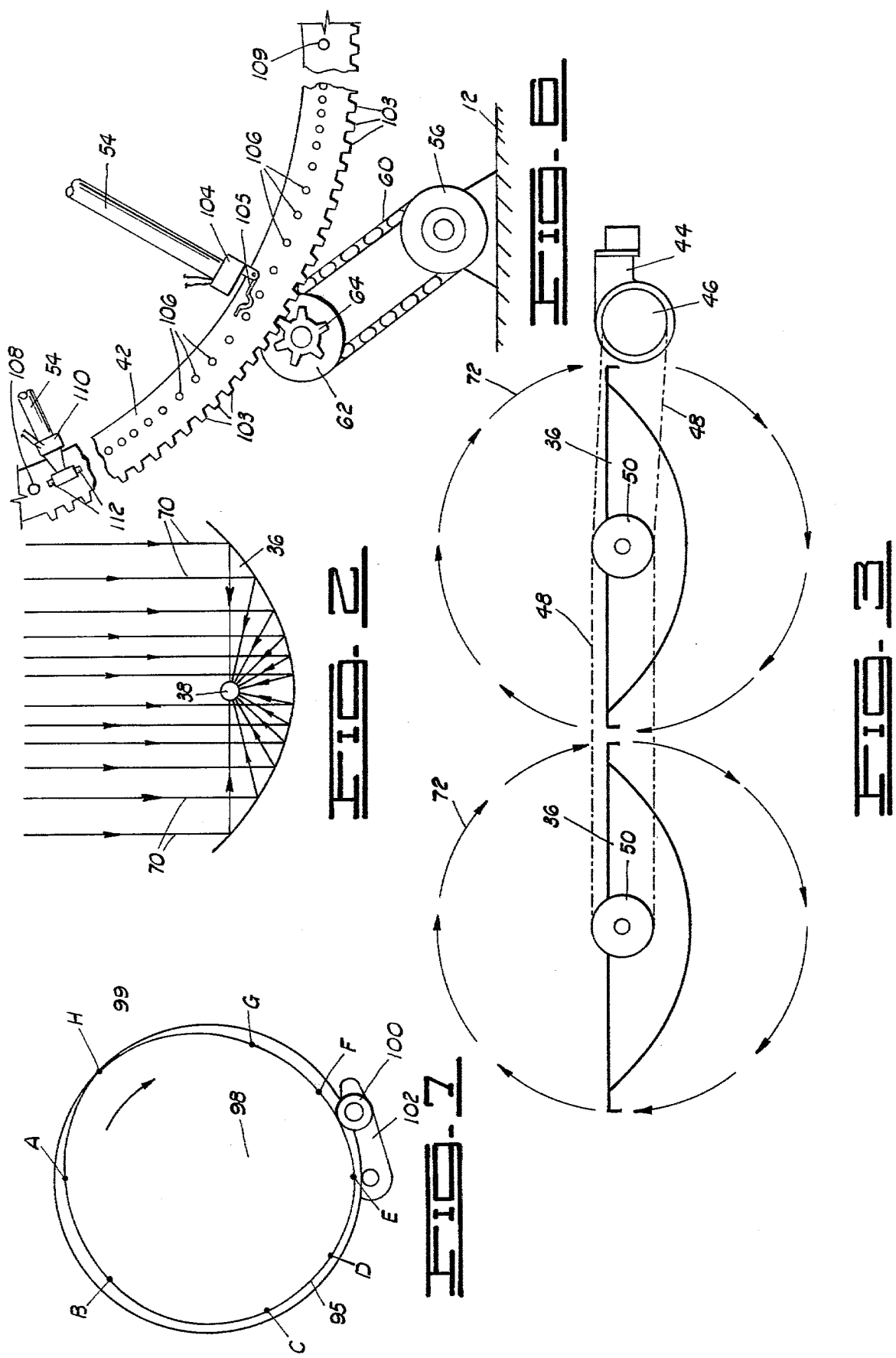

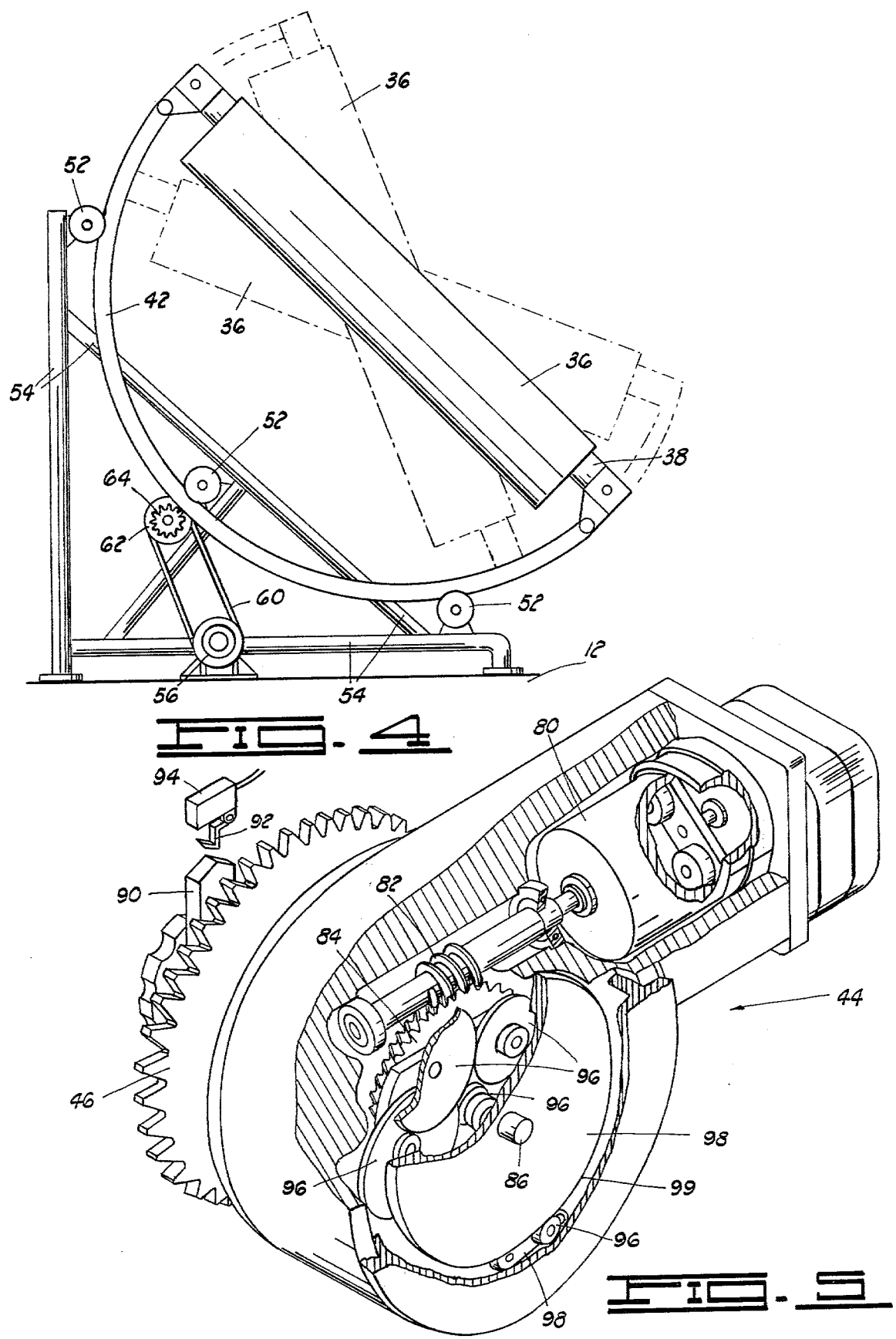

SOLAR TRACKING DEVICE

BACKGROUND OF THE INVENTION

The subject invention relates generally to a solar collection system for heating a fluid using the sun rays, and more particularly, but not by way of limitation, to the use of reflector banks used for reflecting the sun rays onto collector tubes for heating the fluid. The reflector banks rotating once every twenty-four hours as the earth rotates in its daily cycle. Also, the reflector banks adjust daily so that they remain perpendicular to the sun during the change in azimuth of the sun, during the course of one year.

Heretofore, there have been various types of solar collectors which are adapted for tracking the sun and collecting solar energy therefrom. Also, there have been various solar collectors using reflector panels having a parabolic design. In particular, U.S. Pat. No. 1,047,554 to Nichols and U.S. Pat. No. 4,015,585 to Fattor disclose parabolic reflecting surfaces for transmitting solar radiation. In re-issued U.S. Pat. No. Re. 25,242 to Toulmin and U.S. Pat. No. 4,010,614 to Arthur, solar tracking apparatus is disclosed for following the sun during the earth's daily rotational cycle. In U.S. Pat. No. 4,031,385 to Zurlaut et al, and U.S. Pat. No. 3,986,021 to Hitchcock, rotational tracking systems of solar collectors are also disclosed.

None of the above prior art patents disclose the specific structure of the subject solar tracking device, nor do these patents disclose the advantages of the invention as described herein.

SUMMARY OF THE INVENTION

The subject invention provides a solar tracking device for collecting heat from the sun and heating a fluid. The device is characterized by revolving reflector banks one revolution every twenty-four hours so that the reflector banks follow the sun as the earth rotates. Also, the tracking device is adapted for rotating the reflector banks so that the banks remain perpendicular to the sun during the change of the sun's azimuth in relation to the earth during the course of one year.

The tracking device further includes means for rotating the reflector banks so that irregularity or aberrations of the movement of the earth in its yearly orbit around the sun are compensated for and the reflector banks accurately track the sun during these irregular movements.

The invention is suitable for installation on existing homes, business buildings, and various other building structures without major modifications of the structure. Also, the tracking device may be installed on any flat surface area which is exposed to the sun light for a major portion of the day. The solar tracking device is adapted for heating fluids such as water so that the hot water may be circulated as a heat transfer medium for heating homes, buildings, or the like.

The solar tracking device is mounted on a base and includes a plurality of parabolic reflector banks rotatably mounted on collector tubes. The collector tubes are disposed along the length of the reflector banks and centered thereon. The reflector banks reflect the sun rays onto the collector tubes for heating a fluid which is circulated through the collector tubes. The reflector banks and collector tubes are supported on a reflector bank frame. A first drive means is mounted on the reflector bank frame and connected to the reflector banks for rotating the reflector banks on the collector tubes one revolution every twenty-four hours, so that the reflector banks continuously follow the sun as the earth rotates. The reflector bank frame is rotatably mounted on a support frame. A second drive means is mounted on the base and connected to the reflector bank frame for rotating the reflector bank frame on the support frame so that the reflector banks remain perpendicular to the sun during the change in azimuth of the sun in relation to the earth during the course of one year.

The advantages and objects of the invention will become evident from the following detailed description when read in conjunction with the accompanying drawings which illustrate the preferred embodiments of the invention.

BRIEF DESCRIPTION OF THE DRAWINGS

FIG. 2 is an end view of a reflector bank illustrating the parabolic reflector design of the reflector bank.

FIG. 3 illustrates a pair of reflector banks synchronized for rotating 360° in tracking the sun during the earth's rotation.

FIG. 4 is a side view of a reflector bank mounted on a reflector bank frame and a support frame.

FIG. 5 illustrates a perspective view of a twenty-four hour drive gear motor which is connected to a chain drive for rotating the reflector banks one revolution every twenty-four hours.

FIG. 6 illustrates a partial view of the reflector bank frame and azimuth drive gear motor for rotating the reflector bank frame so that the reflector banks remain perpendicular to the sun during the change in azimuth.

FIG. 7 is a front view of a cam plate for correcting irregularities in the earth's rotation during the course of the earth's yearly cycle around the sun.

DETAILED DESCRIPTION OF THE DRAWINGS

Figure 1:
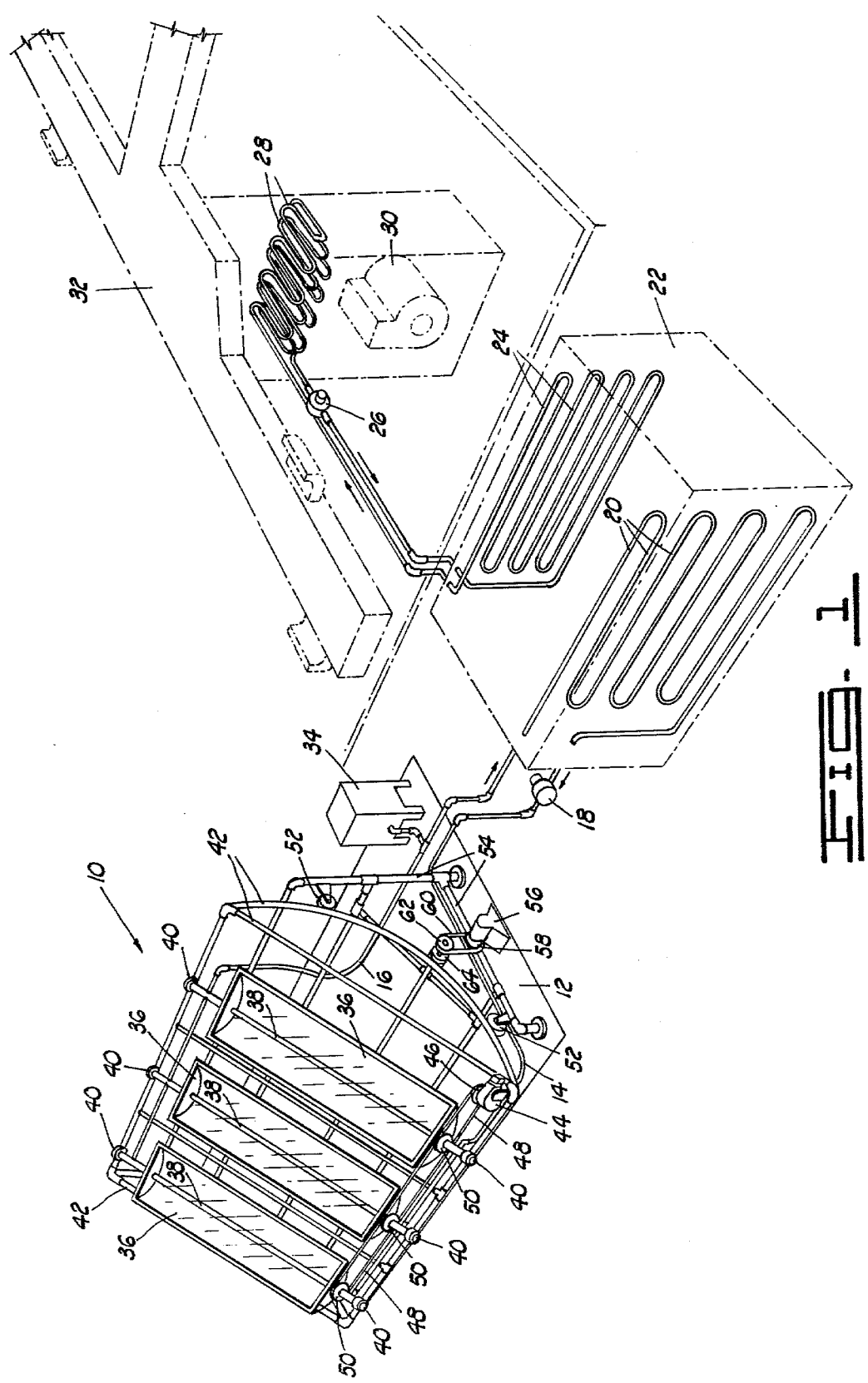
FIG. 1 is a perspective view of the solar tracking device mounted on a flat base and connected to a water reservoir for heating water therein.

In FIG. 1, the solar tracking device is designated by general reference numeral 10. The device 10 is mounted on a flat base 12 and connected to flexible intake pipe 14 and flexible discharge pipe 16. A fluid such as water or any other fluid used for collecting heat is circulated by a circulating pump 18 with the pipes 14 and 16 connected to a plurality of heating coils 20 in a fluid reservoir 22. The heat received in the reservoir 22 is transferred to a plurality of coils 24 and circulated by a circulating pump 26 through a plurality of coils 28 disposed above a conventional blower 30 used for heating and cooling a building having duct work 32 shown in dotted lines. While the reservoir 22, blower 30, and duct work 32 are shown, it should be appreciated that there are various types of heat transfer mediums that can be used for collecting the energy received and circulated through the coils 20 when the fluid therein is heated by the solar tracking device 10. Also mounted on top of the base 12 is a heat expansion tank 34 for providing for the expansion of the fluid when it is heated by the tracking device 10 and expanded in the pipes 14, 16, and the coils 20.

The device 10 includes a plurality of reflector banks 36 rotatably mounted on collector tubes 38. The ends of the collector tubes 38 are mounted on bearing blocks 40 which are attached to a semi-circular reflector bank frame 42. The collector tubes 38 are centered in front of and along the length of the reflector banks 36 and are connected to the flexible intake pipe 14 and discharge pipe 16 for circulating fluid therethrough. The reflector banks 36 receive the sun's rays thereon and reflect the rays onto the collector tubes 38 for heating the fluid as it is circulated through and along the length of the collector tubes 38.

The reflector banks 36 rotate 360° on the collector tubes 38 by a twenty-four hour drive gear motor 44 having a drive gear 46 attached to a drive chain 48 which in turn is connected to drive pulleys 50 mounted at the lower end of the reflector banks 36. The drive gear 46 is geared to make one revolution per twenty-four hours. By rotating the reflector banks 36, the banks 36 receive the sun's rays from sunrise to sunset and continue to follow the sun during the nighttime until the sun again rises.

The reflector bank frame 42 is rotatably mounted on rollers 52 attached to a support frame 54. The reflector bank frame 42 is rotated on the support frame 54 by an azimuth drive gear motor 56 having a drive gear 58 attached to a chain drive 60 which in turn is attached to a drive pulley 62. The drive pulley 62 is mounted on the support frame 54 and is attached to a gear 64, shown in FIG. 6, which engages a portion of the reflector bank frame 42.

In FIG. 1, the reflector banks 36 mounted on the reflector bank frame 42 are oriented toward the south with the length of the collector tubes 38 providing a north-south axis for rotating the banks 36 thereon. The length of the reflector bank frame 42 from right to left is positioned in an east-west direction. By rotating the reflector bank frame 42 daily, the reflector banks 36 are oriented so that they are perpendicular to the sun as the sun changes its azimuth in relationship to the earth as the earth rotates around the sun.

In FIG. 2, a top view of one of the collector banks 36 is illustrated with the collector tube 38 centered in front of the collector bank 36. The surface of the reflector bank 36 has a parabolic design so that the parallel sun rays indicated by arrows 70 are reflected from the surface of the reflector bank 36 to the collector tube 38 thereby heating the fluid which is circulated inside the collector tube 38. While the parabolic design of the reflector bank 36 is illustrated, it should be appreciated that other types of reflector surfaces could be used equally well on the reflector banks 36 for transmitting the sun's rays to the collector tube 38.

FIG. 3 is an end view of a pair of reflector banks 36 having drive pulleys 50 connected to the drive chain 48 which is attached to the drive gear 46 of the twenty-four hour drive gear motor 44. In this figure, the two reflector banks 36 can be seen rotating 360° as represented by arrows 72.

In FIG. 4, a side view of the reflector bank 36 is illustrated for depicting the change in azimuth of the sun in relationship to the earth. While the degree of slope of the reflector bank 36 on the support frame 42 will vary depending on its location on the earth's surface, the change in azimuth of the sun in relationship to the earth is a constant 47 degrees. The change in slope of the reflector bank 36, shown in solid and dotted lines, would represent the typical slope of the bank 36 in an installation on the North American continent. When the reflector bank 36 is lowered to its lowest position shown in FIG. 4 in dotted lines, this slope would represent the position of the reflector bank 36 on June 20. After June 20, the reflector bank 36 daily will begin rotating clockwise until it reaches its highest position, shown in dotted lines, at December 20. After December 20, the direction of the reflector bank 36 is reversed and the bank 36 is rotated counter clockwise until it again reaches the position at June 20.

In FIG. 5, a perspective view of the twenty-four hour drive gear motor 44 is illustrated. The motor 44 includes a synchronous motor 80 attached to a worm gear drive shaft 82 which in turn is geared to a bevel gear 84 attached to an output shaft 86. The output shaft 86 is attached to the drive gear 46 which is used for driving the drive chains 48 and rotating the reflector banks 36. Mounted on the output shaft 86 and positioned adjacent the drive gear 46 is a pointed trip lever 90 which contacts an electric switch arm 92 of a switch 94 which is electrically wired to the azimuth drive gear motor 56. The lever 90 rotates one revolution every twenty-four hours, contacting the switch arm 92 and turning the azimuth drive gear motor 56 to an "on" position so that a daily correction may be made in the change in the azimuth of the sun.

The twenty-four hour drive gear motor 44 further includes a plurality of spur gears 96 geared to the output shaft 86 and engaging a cam plate 98 having an eccentric outer circumference 99 which is discussed in detail under FIG. 7. The cam plate 98 is geared to make one revolution every 365¼ days. The outer circumference 99 of the cam plate 98 is engaged by a cam roller 100 which is attached to a cam arm 102 which in turn is geared to the output gear 46 for providing an oscillating motion which in turn slightly speeds up or slows down the rotation of the output shaft 86 to compensate for irregularities or aberrations which occur in the regular progression of the earth in its annual eliptical orbit around the sun. This known fact of the irregularities of the eliptical orbit of the earth are incorporated into the subject invention so that the reflector banks 36 are continuously oriented directly toward the sun any time of the year and perpendicular thereto.

In FIG. 6, a side view of the azimuth drive gear motor 56 is illustrated with the gear 64 engaging a gear rack 103 in a portion of the semi-circular reflector bank frame 42. By rotating the gear 64 on the gear rack 103, the 47° azimuth change is adjusted daily so that the reflector banks 36 are continuously perpendicular to the sun. When the trip lever 90 actuates the switch 94, the switch 94 turns on the azimuth drive motor 56. When the azimuth drive motor 56 is turned on, the gear 64 rotates on the gear rack 103 moving the semi-circular reflector bank frame 42 either upwardly or downwardly until a switch arm 105 attached to a second electrical switch 104 contacts one of a plurality of azimuth pins 106. The switch 104 is attached to a portion of the support frame 54. When the switch arm 105 contacts one of the azimuth pins 106, the second switch 104 is opened. The second switch 104 is wired to the first switch 94 and in turn opens the switch 94 stopping the azimuth drive gear motor 56. It should be noted that the plurality of azimuth pins 106 are mounted along a portion of the semi-circular reflector bank frame 42 with the distance between the individual pins 106 representing the degree of change of azimuth from day to day. As June 20 and December 20 are approached, the individual pins 106 are spaced closer to each other since the degree of daily change in the azimuth becomes less and less.

To change the direction of the azimuth drive gear motor 56, a pair of reversing pins 108 and 109 are mounted on the sides of the semi-circular reflector bank frame 42 for contacting a reversing switch 110 having a pair of switch contacts 112 for contacting the pins 108 and 109. The reversing switch 110 is attached to a portion of the support frame 54. The switch contacts 112 contact pin 108 at June 20 to reverse the direction of the azimuth drive gear motor 56 so that the reflector bank 36 begins to rotate in a clockwise direction until it reaches December 20 and then contacts the second reversing pin 109 to again reverse the direction of the reflector bank 36 in a counter clockwise direction. The electrical wiring of the switches 94, 104, and 110 is not shown in FIGS. 5 and 6, but it can be appreciated that anyone skilled in electrical wiring could wire the switches as described.

In FIG. 7, the eccentric outer circumference of the cam plate 98 is illustrated. Also seen in this view is the cam roller 100 attached to a cam arm 102 which in turn is attached to the gear drive 46 of the twenty-four hour drive gear motor 44. As mentioned earlier, cam plate 98 rotates one revolution per year. Point A on the cam plate 98 represents December 20 and at this position at twelve o'clock noon the sun is exactly due south. At point B, representing February 5, the sun is sixteen minutes late in reaching a zenith point or due south. Therefore, at point B, the radius of the eccentric surface of the plate 98 is less than the radius at point A and the cam roller 100 will have slowed down the output of the twenty-four hour drive gear motor 44 to compensate for the sun being sixteen minutes late in reaching due south. Point C represents April 15. At this point, the sun is normal with the zenith at twelve o'clock noon. Point D represents May 5 and at this point the sun is six minutes fast. Therefore, at this time because the radius to point D of the cam plate 98 is greater, the gear motor 44 is increased in speed. At point E, which represents June 20, the sun is normal with the zenith. On August 1, represented by point F, the sun is again six minutes slow. Point G represents September 1 and at this time the sun is 16 minutes fast. When the cam roller 100 again contacts point A on December 20, the sun is due south at twelve o'clock noon. By making high and low lobes on the eccentric surface of the cam plate 98, means for imparting an oscillating motion for speeding up or slowing down the output of the drive gear 46 is accomplished to correspond with the gain or lag of the sun as the earth rotates in an irregular eliptical orbit.

Changes may be made in the construction and arrangement of the parts or elements of the embodiment as disclosed herein without departing from the spirit or scope of the invention as defined in the following claims.

I claim:

1. A solar tracking device mounted on a base, the device collecting heat from the sun and heating a fluid, the heated fluid circulated from the device and used as a heat transfer medium, the device comprising:
    a reflector bank rotatably mounted on a collector tube, said collector tube disposed adjacent the length of said reflector bank and centered thereon, said reflector bank reflecting the sun rays onto said collector tube for heating the fluid which is circulated through said collector tube;
    a reflector bank frame, the ends of said collector tube attached to said reflector bank frame, said reflector bank frame supporting said collector tube and said reflector bank thereon, said reflector bank frame being generally semi-circular in shape, the ends of said semi-circular reflector bank frame attached to the ends of said collector tube;
    first drive means mounted on said reflector bank frame and connected to said reflector bank for rotating said reflector bank one revolution every twenty-four hours so that said reflector bank follows the sun as the earth rotates;
    a support frame adapted for mounting on the base, said reflector bank frame rotatably mounted on said support frame; and
    second drive means adapted for mounting on the base and connected to said reflector bank frame for rotating said reflector bank frame on said support frame so that said reflector bank remains perpendicular to the sun during the change is azimuth during the course of one year.

2. The device as described in claim 1, further including a plurality of reflector banks rotatably mounted on collector tubes attached to said reflector bank frame, said reflector banks having a parabolic design for reflecting the sun rays onto said collector tubes.

3. The device as described in claim 1 wherein said second drive means is an azimuth drive gear motor, said azimuth drive gear motor having a drive gear attached to a chain drive, said chain drive connected to a drive pulley, said drive pulley having a gear attached thereto, said gear engaging a gear tooth rack mounted on said reflector bank frame for rotating said reflector bank frame on said support frame.

4. A solar tracking device mounted on a base, the device collecting heat from the sun and heating a fluid, the heated fluid circulated from the device and used as a heat transfer medium, the device comprising:
    a reflector bank rotatably mounted on a collector tube, said collector tube disposed adjacent the length of said reflector bank and centered thereon, said reflector bank reflecting the sun rays onto said collector tube for heating the fluid which is circulated through said collector tube;
    a reflector bank frame, the ends of said collector tube attached to said reflector bank frame, said reflector bank frame supporting said collector tube and said reflector bank thereon;
    first drive means mounted on said reflector bank frame and connected to said reflector bank for rotating said reflector bank one revolution every twenty-four hours so that said reflector bank follows the sun as the earth rotates, said drive means being a twenty-four hour drive gear motor, said motor having a drive gear attached to a chain drive, said chain drive connected to a drive pulley mounted on one end of said reflector bank for rotating said reflector bank on said collector tube, and said motor having an irregular movement in revolving one rotation every twenty-four hours, the irregular movement corresponding with the irregular movement of the earth's yearly orbit around the sun so that said reflector bank continuously follows the sun as the earth rotates;
    a support frame adapted for mounting on the base, said reflector bank frame rotatably mounted on said support frame; and
    second drive means adapted for mounting on the base and connected to said reflector bank frame for rotating said reflector bank frame on said support frame so that said reflector bank remains perpendicular to the sun during the change in azimuth during the course of one year.

5. The device as described in claim 4 wherein said twenty-four hour drive gear motor includes a cam plate mounted thereon and having an eccentric surface corresponding with the irregularities of the earth's movement around the sun, said cam plate speeding up or slowing down the output of said twenty-four hour drive gear motor so that said drive gear motor accurately tracks the sun during the irregularity of the earth's orbit around the sun.

* * * * *